Aug. 16, 1960 H. H. FLOURNOY, JR., ET AL 2,949,388

METHOD FOR COATING MODULES WITH A HEAT CURABLE PROTECTIVE COATING MATERIAL

Filed Oct. 11, 1957 2 Sheets-Sheet 1

INVENTORS
Harold H. Flournoy Jr.
John L. Bodkin
BY
George W. Price

INVENTORS
Harold H. Flournoy Jr.
John L. Bodkin
BY
George W. Price

United States Patent Office 2,949,388

Patented Aug. 16, 1960

2,949,388

METHOD FOR COATING MODULES WITH A HEAT CURABLE PROTECTIVE COATING MATERIAL

Harold H. Flournoy, Jr., Arlington, and John L. Bodkin, Alexandria, Va., assignors, by mesne assignments, to Illinois Tool Works, Chicago, Ill., a corporation of Illinois Filed Oct. 11, 1957, Ser. No. 689,704

3 Claims. (Cl. 117—212)

This invention relates to methods for applying protective coatings to electronic and electrical equipment, and is more particularly concerned with the provision of methods for coating modules of the general types disclosed in Patent No. 2,774,014, issued December 11, 1956, to R. L. Henry, Jr.

As disclosed in the above-mentioned patent, a module is a standardized, interchangeable sub-assembly combining all the requirements of an electronic circuit. More specifically, a conventional module comprises a plurality of ceramic wafers arranged in spaced stacked relationship upon wire conductors, the wafers having electronic components thereon connected to the conductors.

After assembly of a module, it is also conventional to coat the module with a moisture resistant coating material, such as a thermosetting plastic, which is applied by first dipping the module into a bath of liquid thermosetting plastic to form a coating thereon, then air drying the coating material on the module, and then heating the coated module to cure the coating material thereon.

An object of the present invention is to provide a novel method by which protective coatings may be inexpensively applied to electronic and electrical equipment, such as modules.

Another object of the invention resides in the provision of a relatively simple, inexpensive novel method for supporting groups of modules during the application of coating material thereto.

A further object of the invention resides in the provision of a novel use carrier adapted to support a group of modules, and means for detachably mounting the modules on the carrier.

Another object of the invention resides in the provision of a novel method adapted for use in applying coating material to either tube socket type modules or socketless type modules.

Another object of the invention resides in the provision of a novel method embodying means for sealing the socket pin receiving passages to prevent the flow of coating material thereinto.

The invention embodies other novel features, details of construction, and arrangements of parts which are hereinafter set forth in the specification and claims and illustrated in the accompanying drawings, wherein:

Figure 1:
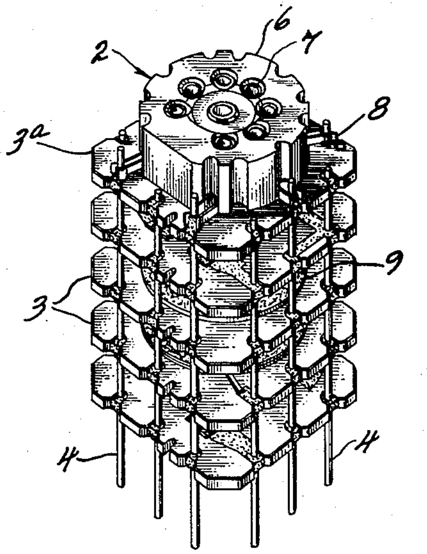
Fig. 1 is a perspective view illustrating a conventional socket type module.
Figure 2:
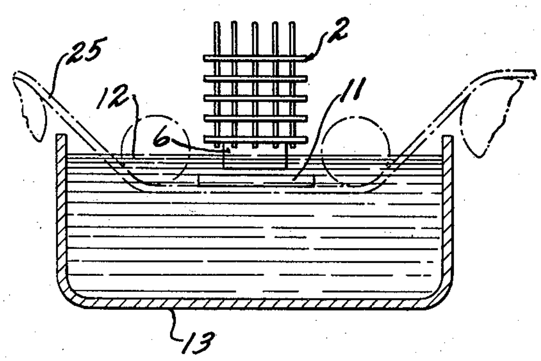
Fig. 2 is a schematic view illustrating the manner in which modules and carrier plates are dipped in a heated wax solution.

Referring now to the drawings for a better understanding of the invention and more particularly to Fig. 1 therein, a conventional tube socket type module 2 is shown as comprising a stack of flat ceramic wafers 3 formed with spaced notches on their edges for soldered engagement to wire conductors 4. A plastic tube socket 6 is secured to the upper wafer 3*a* and formed with passages containing metal grommets 7 to slidably receive the prongs of an electronic tube, the grommets being electrically connected to their respective wire conductors 4 by means of clips 8.

One or more resistors, capacitors, or other electronic components 9 are mounted on the several wafers and electrically connected to the wire conductors 4 to form a modular electronic assembly adapted for use as a complete electronic device, or as a sub-assembly with other modules or other circuits, depending on the components contained on the several wafers and the manner in which they are electrically connected in the circuit. As the present invention is concerned with the provision of methods and apparatus for applying a protective coating to modules, a further description of the module structure, shown in Fig. 1, and its use in electronic circuits is omitted.

Figs. 2 to 6 in the drawings schematically illustrate the method and apparatus employed to facilitate the application of a protective coating material to tube socket type modules 2. The first step in the coating process is to detachably mount, for example, about 15 modules upon a metal carrier 11. This is accomplished by inserting the metal carrier into a body of Cerese wax 12 having a melting point of about 90° C. and heated to a temperature of about 120° C. in a tank 13, the carrier being preferably formed of strip aluminum to respond quickly to heating and cooling.

Figure 3:
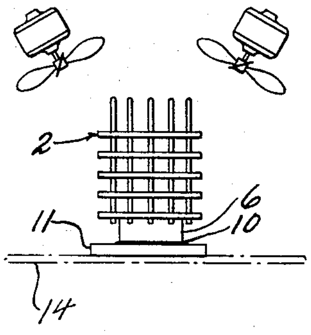
Fig. 3 is a schematic view illustrating the manner in which a socket type module is disposed on and secured to a carrier plate during cooling and solidification of the wax solution thereon.

After the metal carrier becomes heated to a temperature substantially corresponding to the temperature of the heated wax, it is removed therefrom and placed in a horizontal position on a suitable rack. The ceramic tube sockets 6 of the modules to be mounted on the carrier are then dipped to within 1/16 of an inch from the adjacent wafer 3*a* into the heated wax and placed in a row on and along the heated carrier 14, as illustrated in Fig. 3. It will be understood that the metal carrier retains sufficient heat to maintain the wax film thereon in a melted condition until the carrier has been loaded with the desired predetermined number of modules.

The carrier and the modules thereon are then cooled to room temperature to solidify the wax bonds, indicated at 10, between the tube sockets 6 and the carrier. The solidified wax thus serves to secure the modules to the carrier, and also fills the grommets 7 to prevent the passage of coating material thereinto. If desired, streams of air from fans 15 may be employed to cool the carrier, modules, and the wax thereon.

Figure 4:
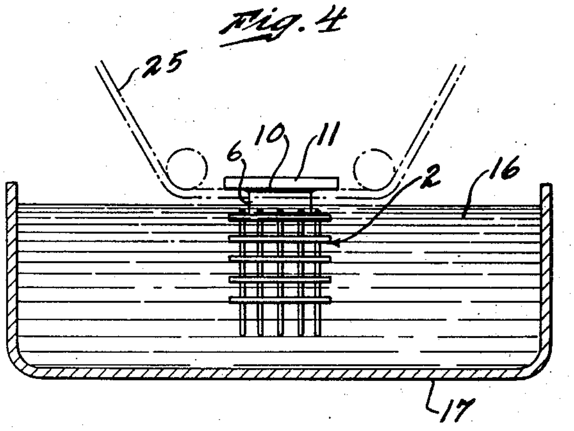
Fig. 4 is a schematic view illustrating the module depending from the carrier plate into a bath of liquid thermosetting plastic coating material.

The carrier 11, with the modules thereon, is then inverted and the ends of the modules 2, below their respective sockets 6, are dipped into a suitable liquid thermosetting plastic coating material 16 contained in a tank 17, as illustrated in Fig. 4. Various coating materials are now available on the market for providing a protective moisture resistant coating on parts of electrical and electronic devices, and a product manufactured and sold by Hooker Electrochemical Co., North Tonawanda, N.Y., under the trademark "Durez" is suitable for such use.

After the modules 2 have been dipped, the coating material thereon is air dried by supporting the ends of the carriers 11 on suitable drying racks.

Figure 6:
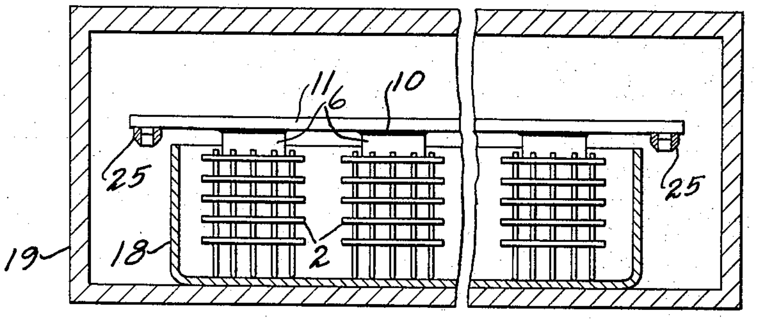
Fig. 6 is a schematic view illustrating the module in an oven for heat curing the coating material thereon and also for unloading the modules from the carrier plate into a tray.

After the coating material on the modules has dried, the carriers 11 and modules 2 thereon are mounted in rows in curing oven trays 18, as illustrated in Fig. 6, with the modules resting on the bottoms of the trays. The trays, loaded with modules on carriers, are then placed in an oven 19 heated to a temperature sufficient to melt the wax bonds 10 and to cure the coating material on the modules. During heat curing of the coating material on the modules, it will be noted that the wax bonds 10 between the carriers and modules will melt to permit the carriers to be removed without disturbing the positions of the modules in the trays. After the coating material on the modules has been heat cured for a predetermined length of time, the trays, with the modules thereon, are removed from the oven 19 for wax impregnation, test and packaging or installation on electronic equipment.

Figure 7:
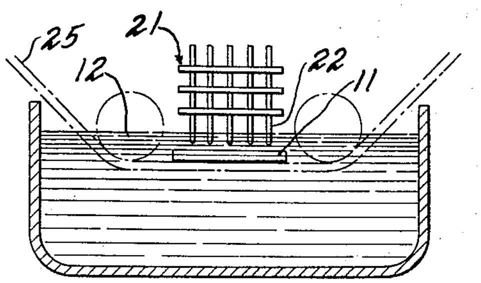
Figs. 7 and 8 are schematic views, corresponding to Figs. 2 and 3, illustrating the manner in which a socketless type module is attached to a carrier plate prior to the application of a coating material thereon.
Figure 8:
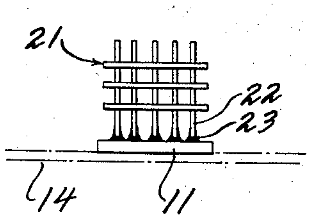

Figs. 7 and 8 illustrate a modified form of the invention in which conventional socketless type modules 21 are mounted on carriers 11. In this form of the invention, the carrier 11 is heated in a body of hot wax 12 and then removed therefrom. The ends of the wire conductors 22 are then dipped into the hot wax, as shown in Fig. 7, and placed upon the heated carrier 11, as shown in Fig. 8, with the wax on the conductors in a liquid condition. During cooling of the carrier and conductors, the wax thereon solidifies and forms fillets 23 of wax securing the module to the carrier.

Figure 5:
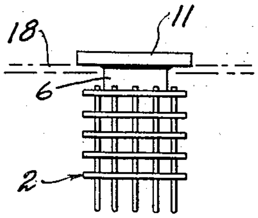
Fig. 5 is a schematic view showing the module coating material being air dried.

After the modules 21 are thus mounted on the carrier 11, they are dipped into a coating material 16, as illustrated in Fig. 4, which is then air dried and heat cured on the modules in oven 19 in the manner illustrated in Figs. 5 and 6. During heat curing of the coating material, the wax fillets 23 melt to permit removal of the carriers 11 from the modules 21 disposed in the curing trays 18. Melting of the wax also leaves the ends of the conductors 22 with bare solderable surfaces.

In each form of the invention, spaced parallel endless conveyors, indicated generally at 25, may be provided to support the carriers 11 at their ends and to move the carriers through the body of heated wax 12 to the module loading and cooling station, then to the coating tank 17 to dip the modules into the coating material, then to the air drying station (see Fig. 5), then into the heated oven 19 to cure the coating material on the modules and for transfer of the latter to the trays 18, and thence from the oven back to the body of wax 12. By using conventional endless conveyor means for moving the units several steps in the coating process, it will be noted that the only manual operation to be performed is in the dipping of the modules in the heated wax and placing same on the carriers.

While the invention has been shown in several forms, it is obvious to those skilled in the art that it is not so limited, but is susceptible of various changes and modifications without departing from the spirit thereof or the scope of the appended claims.

We claim:

1. The method of applying a protective coating of heat curable material to a module, which comprises wax coating a metal carrier by dipping same into a body of hot liquid wax, said wax having a melting temperature lower than the temperature at which said protective coating heat cures, maintaining said carrier in contact with said liquid wax long enough to heat the carrier to substantially the temperature of said liquid wax, removing the wax coated carrier from said body of hot liquid wax, wax coating one end of said module by dipping same into said body of wax, mounting said module by its wax coated end on said carrier while the wax on the latter is still in a liquid condition, cooling the carrier and module to form a solidified wax bond therebetween, dipping the carrier supported module into a bath of heat curable protective coating material, and heating the module and carrier to simultaneously cure the protective coating and melt said wax bond, the latter effect facilitating detachment of the module from the carrier.

2. The method of applying a protective coating of heat curable material to the end surface of a module having a tube socket thereon, which comprises wax coating a metal carrier by dipping same into a body of hot liquid wax, said wax having a melting temperature lower than the temperature at which said protective coating heat cures, maintaining said carrier in contact with said liquid wax long enough to heat the carrier to substantially the temperature of said liquid wax, removing the wax coated carrier from said body of hot liquid wax, wax coating the end surface of the tube socket on said module by dipping same into said body of wax, mounting said module by its wax coated end on said carrier while the wax on the latter is still in a liquid condition, cooling the carrier and module to form a solidified wax bond therebetween, dipping the carrier supported module into a bath of heat curable protective coating material, and heating the module and carrier to simultaneously cure the protective coating and melt said wax bond, the latter effect facilitating detachment of the module from the carrier.

3. The method of applying a protective coating of heat curable material to a module, which module has wire conductors projecting from one end thereof which comprises wax coating a metal carrier by dipping same into a body of hot liquid wax, said wax having a melting temperature lower than the temperature at which said protective coating heat cures, maintaining said carrier in contact with said wax long enough to heat the carrier to substantially the temperature of said liquid wax, removing the wax coated carrier from said body of hot liquid wax, wax coating the wire conductors of the module which project from one end thereof, mounting said wax coated wire conductors on said carrier while the wax on the latter is still in a liquid condition, cooling the carrier and module to form a solidified wax bond therebetween, dipping the carrier supported module into a bath of heat curable protective coating material, and heating the module and carrier to simultaneously cure the protective coating and melt said wax bond, the latter effect facilitating detachment of the module from the carrier.

References Cited in the file of this patent

UNITED STATES PATENTS

| | | |
|---|---|---|
| 599,865 | Richards | Mar. 1, 1898 |
| 2,661,307 | Foster | Dec. 1, 1953 |
| 2,784,117 | Linden | Mar. 5, 1957 |
| 2,812,740 | Kirijan | Nov. 12, 1957 |